(12) United States Patent
Ohtsuki et al.

(10) Patent No.: US 7,004,290 B2
(45) Date of Patent: Feb. 28, 2006

(54) ELECTRICALLY POWERED BRAKE SYSTEM

(75) Inventors: Hisashi Ohtsuki, Iwata (JP); Masuo Takaki, Osaka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/780,646

(22) Filed: Feb. 19, 2004

(65) Prior Publication Data

US 2004/0164608 A1 Aug. 26, 2004

(30) Foreign Application Priority Data

Feb. 25, 2003 (JP) .............................. 2003-047529

(51) Int. Cl.
*B60T 8/00* (2006.01)
*F16C 32/00* (2006.01)

(52) U.S. Cl. ..................... 188/162; 188/72.8; 384/448

(58) Field of Classification Search ........ 188/156–162, 188/18 A, 26, 72.8; 303/20; 384/448; 324/173, 324/174
See application file for complete search history.

(56) References Cited

U.S. PATENT DOCUMENTS

| | | | | |
|---|---|---|---|---|
| 4,995,483 A | * | 2/1991 | Moseley et al. ............ | 188/162 |
| 5,184,069 A | | 2/1993 | Adler et al. | |
| 5,348,123 A | * | 9/1994 | Takahashi et al. ......... | 188/72.1 |
| 5,499,865 A | * | 3/1996 | Katagiri et al. .......... | 303/115.2 |
| 5,640,087 A | | 6/1997 | Alff | |
| 5,967,669 A | * | 10/1999 | Ouchi ........................ | 384/448 |
| 6,037,766 A | * | 3/2000 | Goossens et al. ........... | 324/173 |
| 6,229,298 B1 | * | 5/2001 | Sakamoto et al. .......... | 324/174 |
| 6,406,186 B1 | * | 6/2002 | Torii et al. .................. | 384/448 |
| 6,814,190 B1 | * | 11/2004 | Olschewski et al. ....... | 188/72.8 |
| 2002/0020591 A1 | * | 2/2002 | Schanzenbach et al. .... | 188/158 |
| 2002/0033638 A1 | * | 3/2002 | Okada et al. ................ | 303/20 |
| 2002/0167305 A1 | | 11/2002 | Sentoku et al. | |
| 2003/0234578 A1 | * | 12/2003 | Takahashi et al. .......... | 303/168 |

FOREIGN PATENT DOCUMENTS

| | | |
|---|---|---|
| EP | 0 671 628 A1 | 9/1995 |
| EP | 0 947 724 A2 | 10/1999 |

OTHER PUBLICATIONS

Tsuchiya Shoichi, Patent Abstracts of Japan, "Electrically-Powered Disk Brake", Publication No. 2002-257165, Date of Publication: Sep. 11, 2002.

* cited by examiner

*Primary Examiner*—Chris Schwartz (57) ABSTRACT

To provide an electrically powered brake system capable of performing a control of the braking force appropriate to a particular wheel rotational speed with high response and capable of being simplified in structure with no need to employ any hydraulic equipment and the related pipe lines, the electrically powered brake system includes an actuating unit 18 including a brake wheel 16 mounted on a vehicle wheel 1 and brake pieces 17 frictionally engageable with the brake wheel 16. A drive unit 19 is operable to translate a rotary output of an electric drive motor 20 into a rectilinear reciprocating motion by means of a ball screw mechanism 23, which rectilinear reciprocating motion is transmitted to the brake pieces 17 as a braking force. An operating unit 32 is operable to control the electric drive motor 20 according to manipulation of an operating member 31 such as, for example, a brake pedal. An anti-skid control device 35 is provided for regulating the braking force, exerted by the electric drive motor 20, in dependence on the number of revolutions of the vehicle wheel 1 during a braking effected by manipulation of the operating member 31. For a rotation detector 1 for detecting the number of revolutions of the vehicle wheel 1, the rotation detector 1 including a magnetic encoder 37 is employed.

2 Claims, 5 Drawing Sheets

ELECTRICALLY POWERED BRAKE SYSTEM

BACKGROUND OF THE INVENTION

1. Field of the Invention

The present invention generally relates to an electrically powered brake system for use in an automotive vehicle.

2. Description of the Prior Art

The power plant employed in automotive vehicles appears to go through changes from the internal combustion engine that consumes petroleum as a fuel to the hybrid power plant comprised of an internal combustion engine and an electric drive motor that are selectively brought into operation one at a time depending on the operating conditions, or to the power plant comprised of only an electric drive motor.

For the brake device employed in automotive vehicles, an alternative to the hydraulically operated brake device has been suggested, which comprises an electrically powered brake device including an electric drive motor utilized to drive a brake piece. In allowing the brake piece to be linearly moved reciprocatingly between activated and released positions, some of the electrically powered brake devices hitherto suggested make use of a ball screw mechanism (known as a ball-and-nut mechanism) for translating a rotary motion into a rectilinear reciprocating motion. See, for example, the Japanese Laid-open Patent Publication No. 2002-257165.

In the conventional hydraulically operated brake device, an anti-skid brake system is in most instances employed so that during the braking the hydraulic pressure can be regulated in reference to the number of revolutions of at least one vehicle wheel to avoid a premature locking of the vehicle wheel, thereby achieving a proper brake control.

Considering that the conventional anti-skid brake system is generally applied to the hydraulically operated brake device so that the available braking force can be adjusted by regulating the hydraulic pressure, the response thereof is relatively low. Because of this, it has been desired to increase the response that is exhibited when the braking force is adjusted relative to detection of the number of revolutions of the vehicle wheel. Also, the hydraulically operated brake device requires the use of hydraulic equipments such as, for example, a hydraulic pump, a drive motor for driving the hydraulic equipments and associated hydraulic supply and drain pipes and, accordingly, simplification and compactization of an automotive vehicle tend to be hampered.

While to simplify the hydraulic system, double or single hydraulic systems are generally employed in one automotive vehicle, failure of the hydraulic pump and/or the drive motor to operate properly may adversely affect the entire number of vehicle wheels that are placed under the control of the same hydraulic system. This is equally true of the anti-skid control which applies the same control to the entire number of vehicle wheels that are placed under the control of the same hydraulic system. For this reason, no control can be performed that is appropriate to the behavior, i.e., the number of revolutions of each of the four vehicle wheels that tends to vary from one wheel to another during, for example, cornering of the automotive vehicle.

On the other hand, various suggestions hitherto made of the electrically powered brake devices are all directed to component parts of the brake device and no suggestion have yet been made of control features thereof.

SUMMARY OF THE INVENTION

In view of the foregoing, the present invention is intended to provide an electrically powered brake system capable of exhibiting a high response, capable of performing a control of the braking force appropriate to a particular wheel rotational speed and capable of being simplified in structure with no need to employ any hydraulic equipment and the related pipe lines.

Another important object of the present invention is to provide the capability of achieving a proper anti-skid control with respect to the number of revolutions of each of the vehicle wheels that tends to vary from one wheel to another during, for example, cornering of the automotive vehicle.

In order to accomplish these objects of the present invention, the electrically powered brake system herein disclosed includes a brake wheel mounted on a vehicle wheel for rotation together therewith; an actuating unit including brake pieces frictionally engageable with the brake wheel; a drive unit for translating a rotary output of an electric drive motor into a rectilinear reciprocating motion by means of a ball screw mechanism, which rectilinear reciprocating motion is transmitted to the brake pieces as a braking force; an operating unit for controlling the electric drive motor according to manipulation of an operating member; a rotation detector including a magnetic encoder and a sensor, the magnetic encoder being mounted on a rotating side member of a wheel support bearing assembly for supporting the vehicle wheel and having a plurality of opposite magnetic poles alternating in a direction circumferentially thereof, the sensor being mounted in face-to-face relation with the magnetic encoder for detecting passage of the opposite magnetic poles; an anti-skid controller for regulating the braking force, exerted by the electric drive motor, in dependence on the number of revolutions of the vehicle wheel detected by the rotation detector during a braking effected by manipulation of the operating member, to thereby prevent rotation of the vehicle wheel from being locked.

According to the present invention, when the operating member is operated to effect a braking, the electric drive motor can be driven under the control of the operating unit and rotation of the electric drive motor is then translated through the ball screw mechanism into a rectilinear reciprocating motion that is assumed by the brake pieces with the brake wheel consequently clamped by the brake pieces, thereby achieving the braking. At this time, the anti-skid controller regulates the braking force, exerted by the electric drive motor, in dependence on the number of revolutions of the vehicle wheel 1 to thereby prevent the rotation of the vehicle wheel 1 from being locked. Thus, the provision of the anti-skid controller in the electrically powered brake system is effective in that the braking force can be regulated with a high response to the detection of rotation of the vehicle wheel, allowing an accurate braking to be carried out. Also, the use of the electric drive motor as a source of drive is effective to substantially eliminate the need to use any hydraulic equipments and hydraulic pipe lines and, therefore, the structure around the vehicle wheel can advantageously be simplified.

Also, since as a mechanism for converting the rotary motion of the electric motor into the rectilinear reciprocating motion the ball screw mechanism, also known as the ball-and-nut mechanism, is employed, the output from the electric drive motor can be highly efficiently transmitted and the rectilinear motion can be a short distance motion relative to the rotary motion, resulting in that the relatively high braking force for a small output of the electric motor can be obtained. Yet, since the rotation detector for detecting the rotational speed of the vehicle wheel makes use of the magnetic encoder capable of producing a magnetic field as an element to be detected, it is in the form of an active detector having an excellent sensitivity. For these reasons, in combination with the braking characteristics of the electrically powered brake system having a high response, an accurate braking can be achieved with a further appropriated regulation of the braking force.

In a preferred embodiment of the present invention, the actuating unit and the drive unit may be provided for each of four or more vehicle wheels equipped in an automotive vehicle, in which case the anti-skid controller is operable to effect a control to all of those vehicle wheels individually.

Where the anti-skid controller is utilized to individually and separately control the vehicle wheels, it is possible to make best use of the excellent response characteristics of the drive unit in which the electric drive motor and the ball screw mechanism are utilized, so that the vehicle wheels tending to exhibit different numbers of revolutions during, for example, the automotive vehicle cornering or running along the tortuous road can be further effectively braked under the properly exercised anti-skid control.

The present invention also provides a wheel support bearing assembly for use with an electrically powered brake system as discussed above. This wheel support bearing assembly includes an inner race, an outer race positioned radially outwardly of and around the inner race with an annular bearing space defined between it and the inner race, and a series of rolling elements drivingly interposed between the inner and outer races, and a ring-shaped magnetic encoder having a plurality of opposite magnetic poles alternating in a direction circumferentially thereof and mounted on one of the inner and outer races which is rotatable relative to the other. This magnetic encoder cooperates with a sensor, disposed in face-to-face relation therewith, to define a rotation detector. The sensor referred to above may be mounted on one of the inner and outer races which serves as a stationary member in the wheel support bearing assembly, or a wheel suspension device for supporting the wheel support bearing assembly. The magnetic encoder may be provided in a sealing unit that is utilized to seal one of opposite open ends of the annular bearing space delimited between the inner and outer races.

In this wheel support bearing assembly according to the present invention, since the rotation detector for detecting the rotational speed of the vehicle wheel makes use of the magnetic encoder capable of producing a magnetic field as an element to be detected, it is in the form of an active detector having an excellent sensitivity. For this reason, in combination with the braking characteristics of the electrically powered brake system having a high response, an accurate braking can be achieved with a further appropriated regulation of the braking force. Where the magnetic encoder is incorporated in the sealing unit as described above, compactization and reduction in number of component parts used and in number of assembling steps can advantageously be achieved.

In a preferred embodiment of the present invention, the magnetic encoder employed in the wheel support bearing assembly may include a ring-shaped core metal made of a metallic material and forming a part of the sealing unit, and a ring-shaped multi-pole magnet disposed on a surface of the core metal. The multi-pole magnet is preferably a member having a plurality of opposite magnetic poles N and S magnetized to alternate in a direction circumferentially thereof, in which case the neighboring opposite magnetic poles N and S are preferably spaced at intervals of a predetermined pitch p that is chosen to be not greater than 1.5 mm, with a single pitch deviation of ±3%. The single pitch deviation referred to above is represented by the difference in distance between the magnetic poles detected at the position spaced a predetermined distance from the multi-pole magnet, which is expressed by the ratio relative to a target pitch. With this feature residing in the wheel support bearing assembly, it is possible to achieve the detection of rotation with high precision.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A first preferred embodiment of the present invention will be described with particular reference to FIGS. 1 to 4. The electrically powered brake system shown therein is designed to control a vehicle wheel 1 and is rotatably mounted on a wheel support bearing assembly 2. The vehicle wheel 1 includes a rim 3 on which a tire 4 is mounted. The wheel support bearing assembly 2 includes an inner race 5, an outer race 6 positioned radially outwardly of the inner race 5 with an annular bearing space defined between it and the inner race 5, and a plurality of rows of rolling elements 7 operatively accommodated within the annular bearing space between the inner race 5 and the outer race 7. The annular bearing space has its opposite open ends sealed by respective sealing units 8. The outer race 6 is connected with a vehicle body structure (not shown) through a wheel suspension device 9 while a vehicle wheel 1 is fitted to the inner race 5 in any known manner.

Figure 1:
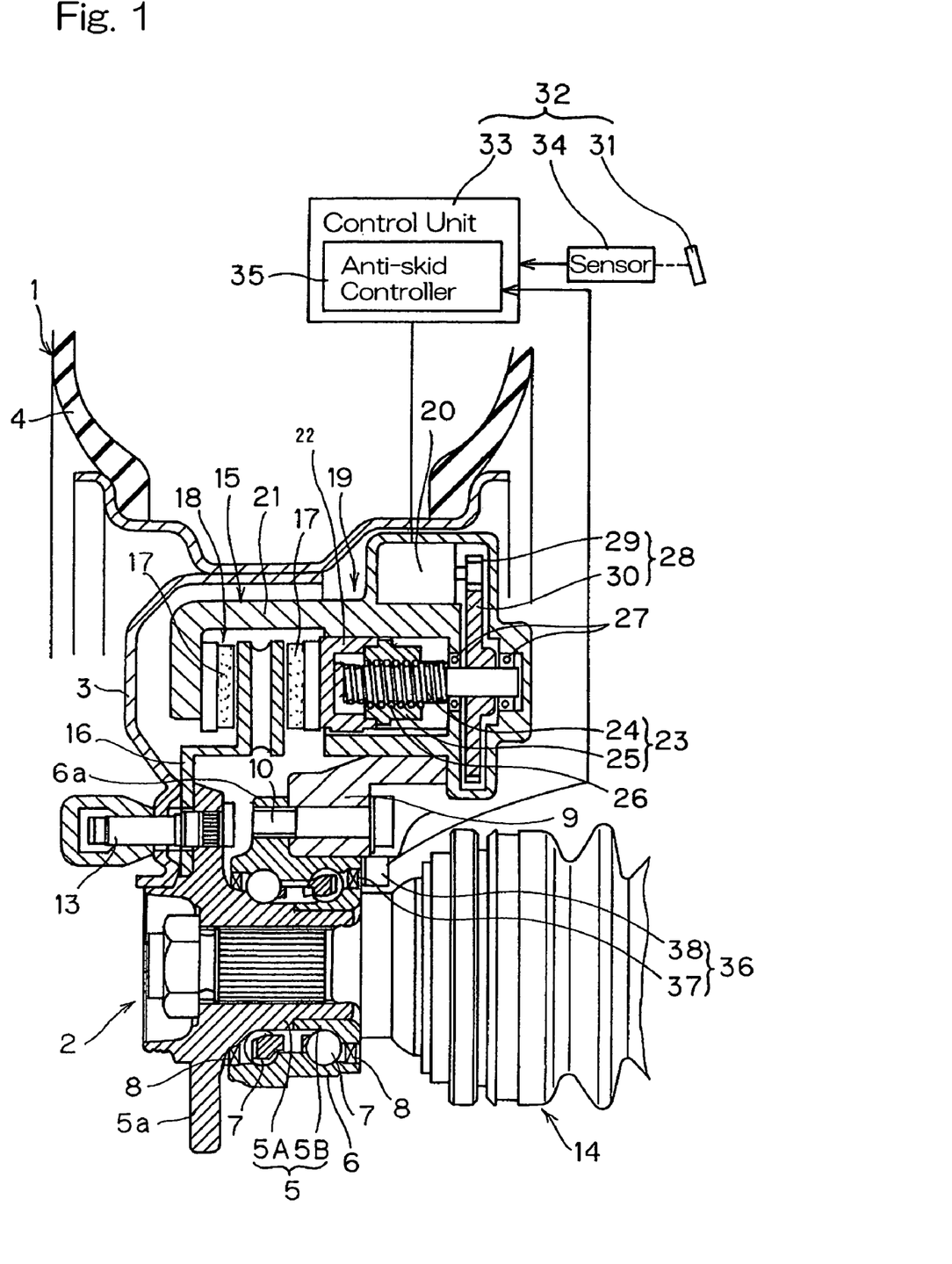
FIG. 1 is a fragmentary longitudinal sectional view of an electrically powered brake system according to a first preferred embodiment of the present invention, shown together with a control system employed in association therewith.

While the wheel support bearing assembly 2 that can be employed in association with the present invention may be of any known type, the wheel support bearing assembly 2 employed in the illustrated embodiment is of a so-called third generation type in which the outer race 6 has its outer periphery formed with a radially outwardly extending flange 6a through which the outer race 6 is fixed to the wheel suspension device 9 by means of one or more bolts 10. On the other hand, the inner race 5 is formed with a radially outwardly extending wheel fitting flange 5a to which the rim 3 of the vehicle wheel 1 is fitted by means of bolts and nut members 13 together with a brake wheel 16 forming a part of a brake device 15 and rotatable together with both of the inner race 5 and the vehicle wheel 1.

The inner race 5 so far shown is made up of a hub wheel 5A and a single inner race segment 5B with raceway grooves one for each row of the rolling elements 7 being respectively formed in the hub wheel 5A and the single inner race segment 5B. The wheel fitting flange 5a referred to above is formed on the hub wheel 5A. Where the vehicle wheel 1 is a drive wheel, the inner race 5 is drivingly coupled with a constant velocity universal joint 14 so that the vehicle wheel 1 can be driven through the constant velocity universal joint 14 and then through the inner race 5.

The brake device 15 referred to above is of an electrically operated type including an actuating unit 18, having a the brake wheel 16 associated with the vehicle wheel 1 and brake pieces 17 engageable frictionally with the brake wheel 16 from opposite directions, and a drive unit 19 for actuating the brake pieces 17 and utilizing an electric drive motor 20 as a source of drive. The brake wheel 16 referred to hereinabove is in the form of a brake disc, and the brake pieces 17 each in the form of a brake pad are so disposed on respective sides of the brake wheel 16 as to move close towards and away from the brake wheel 16 in respective directions opposite to each other. One of the brake pads 17 is fixed to a brake bracket 21 while the other of the brake pads 17 is fixed to a reciprocating member 22 that is movably mounted on the brake bracket 21 for rectilinear movement in a direction close towards and away from the brake wheel 16 relative to the brake bracket 21. It is to be noted that the reciprocating member 22 is locked in position relative to the brake wheel 16 that rotates together with the vehicle wheel 1 as is well known to those skilled in the art.

The drive unit 19 for the brake device 16 includes, in addition to the electric motor 20 referred to above, a ball screw mechanism (i.e., a recirculating-ball-and-nut mechanism) 23 for translating a rotational output of the electric drive motor 20, that is transmitted thereto through a reduction gear mechanism 28, into a rectilinear reciprocating motion assumed by the brake pieces 17. The ball screw mechanism 23 includes a screw shaft 24 supported by the brake bracket 21 through bearings 27 for rotation about its own longitudinal axis, and a nut member 25 fixedly coupled with the reciprocating member 22 and mounted around the screw shaft 24 through a series of recirculating balls 26. It is to be noted that the reciprocating member 22 and the nut member 25 may be formed integrally with each other, i.e., the nut member 25 may be an integral part of the reciprocating member 22.

In the ball screw mechanism 23 discussed above, the recirculating balls 26 are movably accommodated in part within a helical groove defined in an outer peripheral surface of the screw shaft 24 and in part within a helical groove defined in an inner peripheral surface of the nut member 25. Accordingly, as can readily be recognized by those skilled in the art, it is clear that rotation of the screw shaft 24 about its own longitudinal axis can result in a rectilinear motion of the nut member 25 in a direction parallel to the longitudinal axis of the screw shaft 24. Although not shown, the nut member 24 has incorporated therein a recirculating member for recirculating a series of the recirculating balls 26 along a substantially endless passage defined by the helical grooves defined respectively in the screw shaft 24 and the nut member 25. This recirculating member may be either an external recirculating type which utilizes a return tube or a guide plate, or an internal recirculating type which utilized an end cap or a bridge member.

Since the ball screw mechanism 23 discussed above is of a design sufficient to allow the nut member 25 to reciprocatingly move a relatively slight distance, the ball screw mechanism 23 may be of a structure in which no recirculating member is employed, for example, of a retainer type in which a series of balls 26 positioned between the screw shaft 24 and the nut member 25 are retained by a retainer (not shown).

The reduction gear unit 28 referred to previously is operable to reduce the rotational speed of the electric drive motor 20 and then to transmit the reduced drive to the screw shaft 24 of the ball screw mechanism 23 and is comprised of a train of gears. In the illustrated embodiment, the reduction gear unit 28 includes a drive gear 29 fixedly mounted on an output shaft of the electric drive motor 20, and a driven gear 30 fixedly mounted on the screw shaft 24 and meshed with the drive gear 29. Other than this type of reduction gear unit 28, any reduction gear unit comprised of, for example, a worm and a worm wheel (both not shown) may be employed.

The electrically powered brake system includes the brake device 15 comprised of the actuating unit 18 and the drive unit 19, and an operating unit 32 for controlling the electric drive motor 20 in accordance with manipulation of an operating member 31 such as, for example, a brake pedal, with an anti-skid controller 35 incorporated in the operating unit 32. The operating unit 32 includes, in addition to the operating member 31, a sensor capable of detecting both the amount and the direction of movement of the operating member 31, and a control unit 33 for controlling the electric drive motor 20 in response to a detection signal outputted from the sensor 34, with the anti-skid controller 35 provided in this control unit 33. The control unit 33 has a generator (not shown) for generating a motor control signal and a motor drive circuit (not shown) capable of controlling a motor current in dependence on the motor control signal.

The anti-skid controller 35 referred to above is operable to prevent the vehicle wheel 1, then being rotated, from being locked, by regulating a braking force, exerted by the electric drive motor 20, in dependence on the rotation of the vehicle wheel 1 during the braking that is effected by manipulation of the operating member 31. This anti-skid controller 35 detects, during the braking, the number of revolutions of the vehicle wheel 1 by means of a rotation detector 36 and then to lower the drive current to be supplied to the electric drive motor 20 or generate a reverse rotational output, in the event that the locked condition of the vehicle wheel 1 or the incipiency of the vehicle wheel 1 being locked is detected in reference to the detected rotational speed of the vehicle wheel 1, to thereby regulating the braking force, that is, a clamping force with which the brake disc 16 can be clamped by the brake pieces 17.

Figure 2:
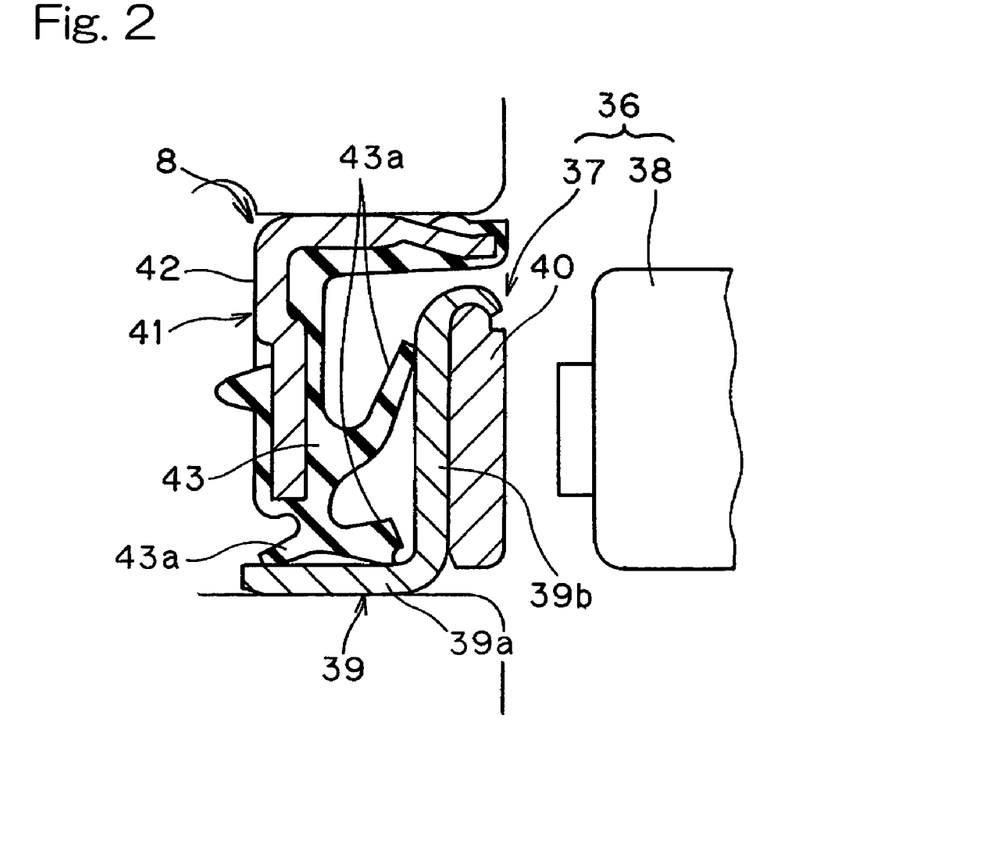
FIG. 2 is a fragmentary longitudinal sectional view, on an enlarged scale, showing a rotation detector employed in the electrically powered brake system of FIG. 1 and a sealing unit incorporating such rotation detector.

The rotation detector 36 is made up of an annular magnetic encoder 37, mounted on the inner race 5 which is a rotatable member of the wheel support bearing assembly 2, and a sensor 38 disposed in face-to-face relation with the magnetic encoder 37. The sensor 38 may be of a type including, for example, a Hall element and is fitted to a fixed member such as, for example, a portion of the outer race 6 of the wheel support bearing assembly 2 or a portion of the wheel suspension device 9 where such fixed member is secured.

Figure 3:
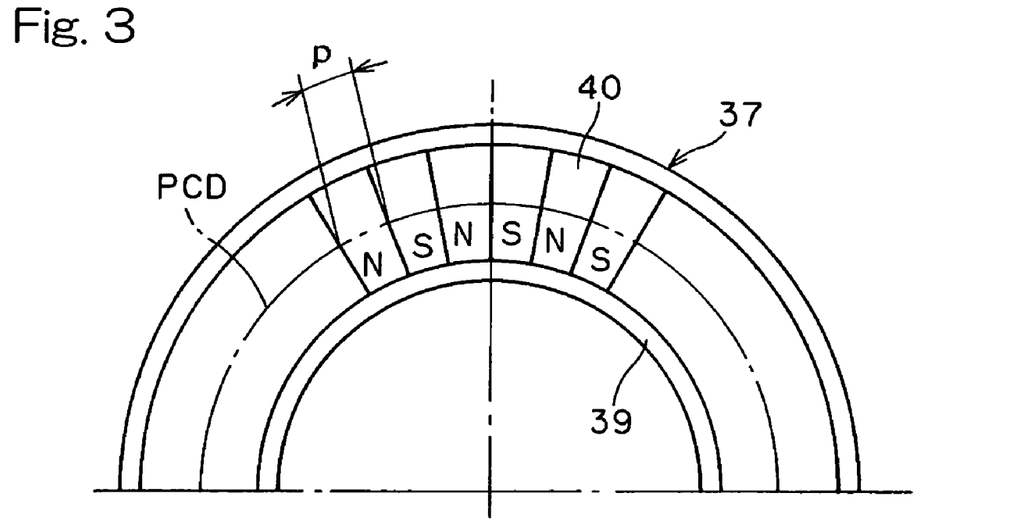
FIG. 3 is an explanatory diagram showing a magnetic encoder employed in the rotation detector as viewed from front.

As shown in FIGS. 2 and 3 on an enlarged scale, the magnetic encoder 37 includes a ring-shaped core metal 39 made of a metallic material and a ring-shaped multi-pole magnet 40 disposed on one surface of the core metal 39. The core metal 39 is made up of an axially extending cylindrical wall 39a and a radially outwardly extending wall 39b lying generally perpendicular to the cylindrical wall 39a so as to render the core metal 39 to represent a generally L-sectioned configuration. The multi-pole magnet 40 is in the form of an annular magnetic plate having a plurality of opposite magnetic poles N and S magnetized so as to alternate one after another in a direction circumferentially thereof. The opposite magnetic poles N and S are so defined as to permit the neighboring opposite magnetic poles N and S to be spaced at intervals of a predetermined pitch p as measured along the pitch circle diameter PCD. The illustrated multi-pole magnet 40 is preferably of a design in which the predetermined pitch p is chosen to be not greater than, for example, 1.5 mm, with a single pitch deviation of ±3%. Accordingly, with this magnetic encoder 37, it is possible to detect the number of revolutions with high precision. It is to be noted that the single pitch deviation referred to above is represented by the difference in distance between the magnetic poles detected at the position spaced a predetermined distance from the multi-pole magnet 40, which is expressed by the ratio relative to a target pitch.

The multi-pole magnet 40 discussed above, which can be employed in the magnetic encoder 37, may be a rubber magnet, a plastic magnet or a sintered magnet.

The magnetic encoder 37 may be designed solely for the purpose of detecting the number of revolutions, but in the illustrated embodiment it forms a part of the sealing unit 8 of the wheel support bearing assembly 2. Specifically, the sealing unit 8 is made up of the core metal 39 of the magnetic encoder 37 and an outer race sealing member 41 carried by the outer race 6 and confronting axially with the core metal 39, with the core metal 39 serving as a slinger. The outer race sealing member 41 is of a structure in which an elastic element 43 is provided on an annular core metal 42 and is provided with a plurality of sealing lips 43a held in sliding engagement with the core metal 39.

Figure 4:
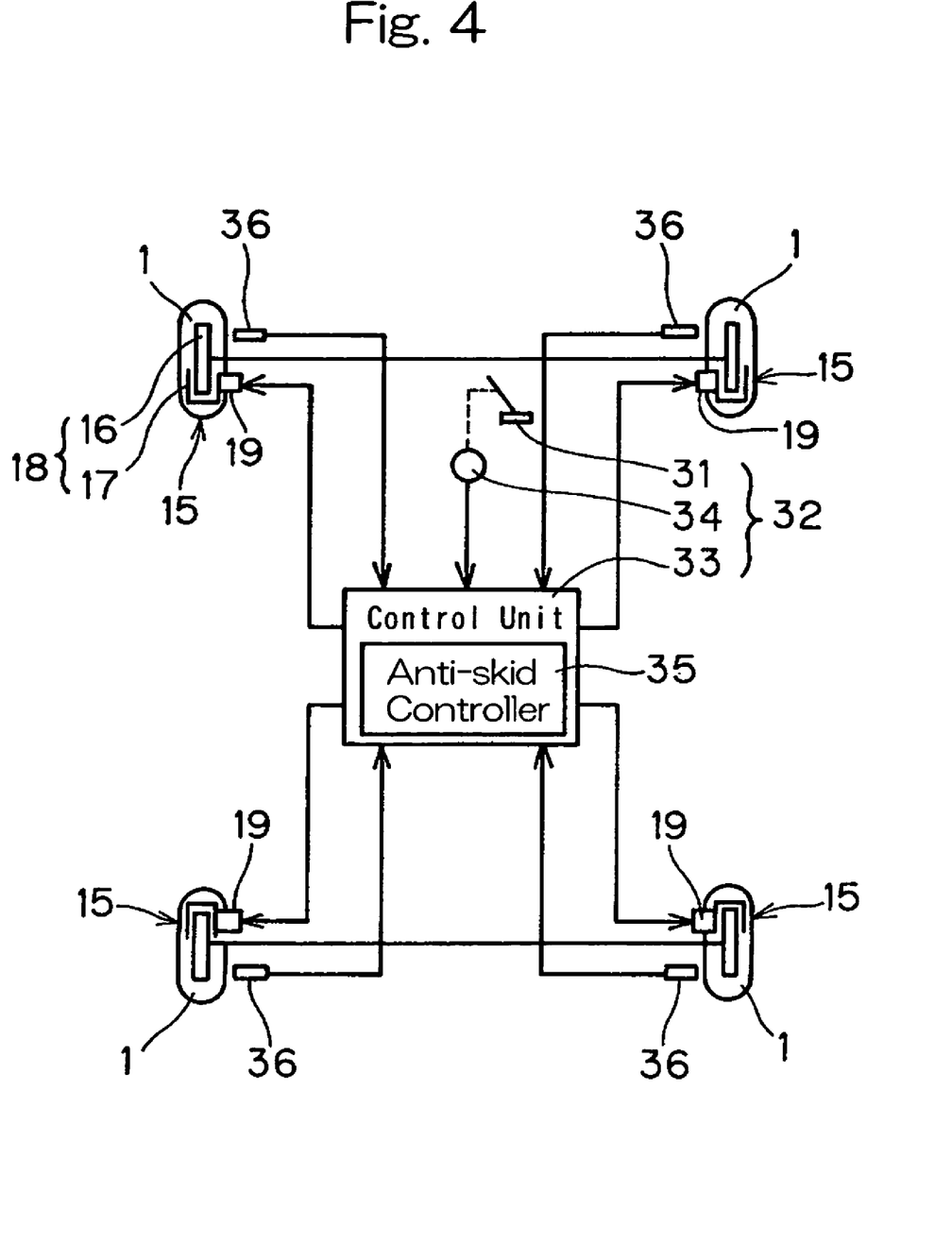
FIG. 4 is a schematic diagram showing the control system for the electrically powered brake system with respect to four vehicle wheels.

Referring now to FIG. 4, the brake device 15 of the structure described hereinabove is employed for each of the vehicle wheels 1. Specifically, in an automotive vehicle having four automotive wheels 1 (i.e., two front wheels and two rear wheels) as shown in FIG. 4, four such brake devices 15 are assigned one for each vehicle wheel 1 as is well known to those skilled in the art. However, the sole operating unit 32 is employed for all of the four brake devices 15, and the rotation detector 36 is employed for each of the four vehicle wheels 1. Although only one anti-skid controller 35 is shown in FIG. 4 for the purpose of convenience, the anti-skid controller 35 is in practice employed for each of the four vehicle wheels 1 so that the braking force exerted in each of the respective brake devices 1 for the vehicle wheels 1 can be relieved in reference to the detected rotation signal fed from the corresponding rotation detector 36.

It is, however, to be noted that as an alternative to that described above, only one anti-skid controller 35 may be employed for a single automotive vehicle, in which case the detected rotation signals fed respectively from the rotation detectors 36 associated with the automotive vehicles 1 can be fed to the sole anti-skid controller 35 so that in the event of the locked condition of one of the vehicle wheels 1 or the incipiency of one of the vehicle wheel 1 being locked, a control to relieve the respective braking forces exerted in those brake devices 15 can be performed.

In the electrically powered brake system of the structure described hereinabove, when the operating member 31 is operated to effect a braking, the electric drive motor 20 shown in FIG. 1 can be driven under the control of the operating unit 32, wherefore rotation of the electric drive motor 20 can be subsequently converted into a rectilinear reciprocating motion of the brake pieces 17 through the ball screw mechanism 23, with the brake wheel 16 consequently clamped by the brake pieces 17, thereby achieving the braking. At this time, the anti-skid controller regulates the braking force, exerted by the electric drive motor 20, in dependence on the number of revolutions of the vehicle wheel 1 to thereby prevent the rotation of the vehicle wheel 1 from being locked.

As hereinbefore described, since the anti-skid controller 35 is employed in the electrically powered brake system, the braking force can be regulated with a high response to the detection of rotation of the vehicle wheel 1. Because of this, an accurate braking can be carried out in which the tendency of the vehicle wheel to skid can be prevented by proper regulation of the braking force and, at the same time, the braking force for preventing rotation of the vehicle wheel from being locked will not be unnecessarily lowered. Also, since the brake device 15 has its drive source comprised of the electric drive motor 20, no use of any hydraulic equipments such as a hydraulic pump and hydraulic pipe lines is needed, allowing the structure to be simplified. Because of this, not only can the braking force be imparted to the individual four vehicle wheels, but also even if a failure to control one of the vehicle wheels 1 occurs during the occurrence of a trouble in the braking force applying system such as, for example, during the occurrence of a failure of the electric drive motor 20, the braking can be satisfactorily effected in the remaining three vehicle wheels with the safety factor consequently increased. Also, the anti-skid control can be effected to the four vehicle wheels individually and separately and can accommodate any difference in number of revolutions between the outer and inner vehicle wheels 1 during cornering or running along a tortuous road, thereby allowing a further proper control to be accomplished.

In addition, since the electrically powered brake system of the present invention makes use of the ball screw mechanism 23 for converting the rotation motion of the electric drive motor 20 into the rectilinear reciprocating motion, the output from the electric drive motor 20 can be highly efficiently transmitted owning to the characteristics inherent of the ball screw mechanism 23 and, also the rectilinear motion can be a short distance motion relative to the rotary motion, resulting in that the relatively high braking force for a small output of the electric motor 20 can be obtained. Where the reduction gear unit 28 is employed, the electric drive motor 20 can be of a type capable of producing a further reduced output.

Also, since the rotation detector 36 for detecting the rotational speed of the vehicle wheel 1 makes use of the magnetic encoder 37 capable of producing a magnetic field as an element to be detected, it is in the form of an active detector having an excellent sensitivity. For this reason, in combination with the braking characteristics of the electrically powered brake system having a high response, an accurate braking can be achieved with a further appropriated regulation of the braking force.

Figure 5:
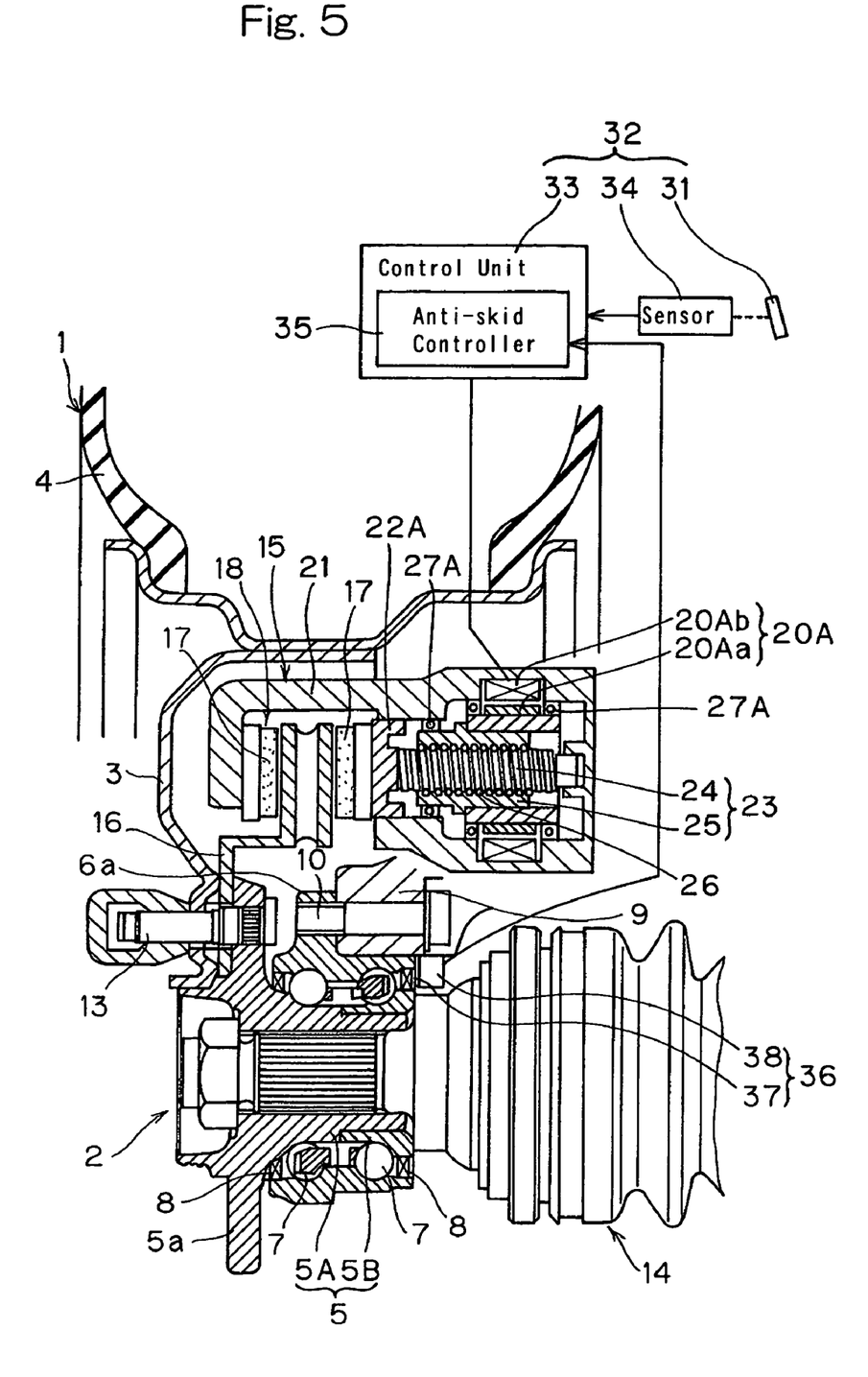
FIG. 5 is a fragmentary longitudinal sectional view of the electrically powered brake system according to a second preferred embodiment of the present invention, shown together with the control system associated therewith.

It is to be noted that in the foregoing embodiment, the screw shaft 24 of the ball screw mechanism 23 has been shown and described as driven by the electric drive motor 20. However, instead of the screw shaft 24 to be driven by the electric drive motor 20, the nut member 25 may be driven by the electric drive motor 20A as shown in FIG. 5. Specifically in the embodiment shown in FIG. 5, the screw shaft 24 is integrated together with the reciprocating member 22A and is reciprocatingly movably supported by the brake frame 21 together with the reciprocating member 22A. On the other hand, the nut member 25 is rotatably supported by the brake frame 21 through a bearing 27A and a rotor 20Aa comprised of a permanent magnet or the like of the electric drive motor 20A is mounted on the outer periphery of the nut member 25. The electric drive motor 20A shown therein is made up of a stator 20Ab, comprised of, for example, a coil or the like disposed in the brake frame 21, and the rotor 20Aa referred to above.

In the alternative embodiment shown in and described with reference to FIG. 5, since the rotor 20Aa of the electric drive motor 20 is coupled with the nut member 25 of the ball screw mechanism 23, a compact, but simplified structure can be obtained even though the rotation of the electric drive motor can neither be reduced to transmit to the ball screw mechanism 23. Other structural features and effects delivered thereby are similar to those shown in and described in connection with the first embodiment of the present invention with reference to FIGS. 1 to 4.

Figure 6:
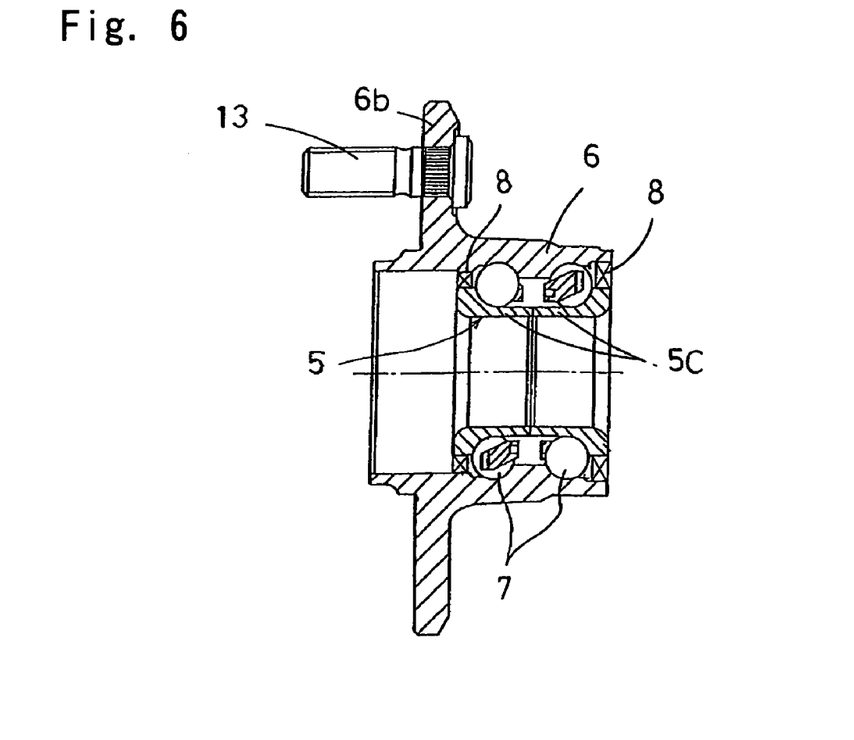
FIG. 6 is a longitudinal sectional view showing a modified form of a wheel support bearing assembly shown in FIG. 5.
Figure 7:
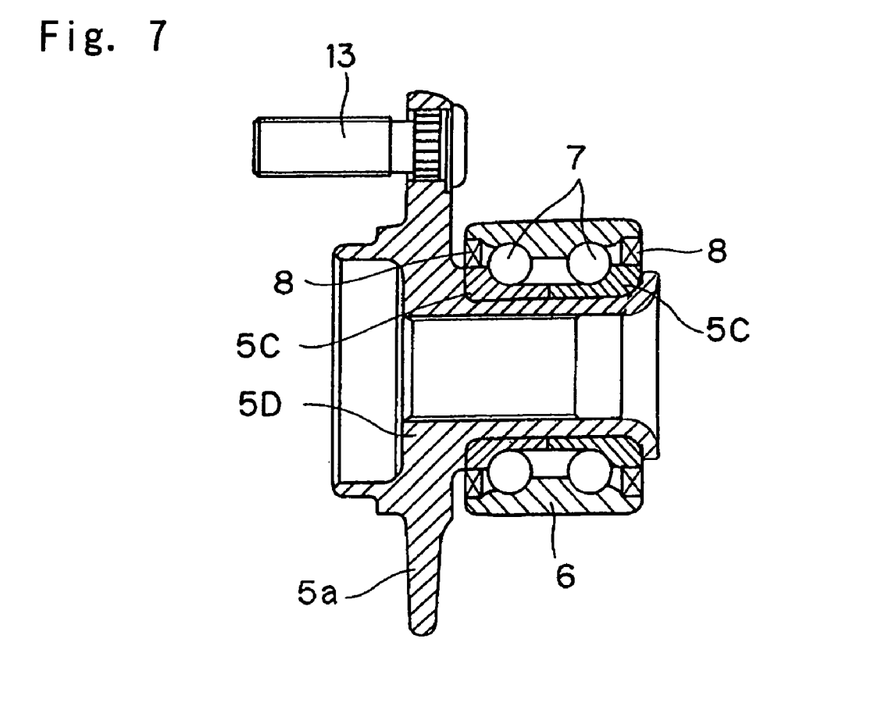
FIG. 7 is a longitudinal sectional view showing a further modified form of the wheel support bearing assembly.

While in any one of the foregoing embodiments the use has been made of the wheel support bearing assembly 2 of the third generation, the present invention can be equally applied to the wheel support bearing assembly of any generation regardless of the model. In addition, the wheel support bearing assembly may be of either an inner race rotating type or an outer race rotating type. By way of example, the present invention is equally applicable to the wheel support bearing assembly of a second generation as shown in FIG. 6 or of a first generation as shown in FIG. 7. In the example shown in FIG. 6, the wheel support bearing assembly is of an outer race rotating type with the wheel fitting flange 6b formed in the outer race 6. The inner race 5 is comprised of two split inner race segments 5C. In the wheel support bearing assembly 2 of the inner race rotating type, the magnetic encoder is mounted on the outer race 6.

On the other hand, the wheel support bearing assembly 2 shown in FIG. 7 is of a type in which no flange is formed in the outer race. The inner race 5 in this example is comprised of two split inner race segments 5C which are in turn mounted on a hub wheel 5D. Although not shown, other than those wheel support bearing assemblies, the wheel support bearing assembly to which the present invention can be applied may be of a fourth generation, that is, of a type in which the inner race and an outer race of the constant velocity universal joint are integrated together.

Yet, although in any one of the foregoing embodiments of the present invention the brake device 15 has been shown and described as utilizing the brake disc, the actuating unit 18 of the brake device 15 may be of a drum brake type in which the brake wheel 16 is comprised of a drum and the brake pieces 17 are each employed in the form of a brake shoe.

Thus, according to the present invention, the electrically powered brake system includes a brake wheel mounted on a vehicle wheel for rotation together therewith; an actuating unit including brake pieces frictionally engageable with the brake wheel; a drive unit for translating a rotary output of an electric drive motor into a rectilinear reciprocating motion by means of a ball screw mechanism, which rectilinear reciprocating motion is transmitted to the brake pieces as a braking force; an operating unit for controlling the electric drive motor according to manipulation of an operating member; a rotation detector including a magnetic encoder and a sensor, the magnetic encoder being mounted on a rotating side member of a wheel support bearing assembly for supporting the vehicle wheel and having a plurality of opposite magnetic poles alternating in a direction circumferentially thereof, the sensor being mounted in face-to-face relation with the magnetic encoder for detecting passage of the opposite magnetic poles; an anti-skid controller for regulating the braking force, exerted by the electric drive motor, in dependence on the number of revolutions of the vehicle wheel detected by the rotation detector during a braking effected by manipulation of the operating member, to thereby prevent rotation of the vehicle wheel from being locked. Accordingly, it is quite clear that the present invention can provide such advantages that not only can a proper control of the braking force relative to the number of revolution of the vehicle wheel be achieved with a high response, but also neither hydraulic equipments nor hydraulic pipe piles are required with the structure around the vehicle wheel consequently simplified.

Also, since the wheel support bearing assembly of the present invention makes use of the magnetic encoder as an element to be detected for detecting the number of revolutions, an accurate braking can be achieved with a further appropriated regulation of the braking force, in combination with the braking characteristics of the electrically powered brake system having a high response, particularly where it is employed in association with the electrically powered brake system of the present invention.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein:

What is claimed is:

1. A wheel support bearing assembly for use with an electrically powered brake system, said electrically powered brake system comprising:

a brake wheel mounted on a vehicle wheel for rotation together therewith;

an actuating unit including brake pieces frictionally engageable with the brake wheel;

a drive unit translating a rotary output of an electric drive motor into a rectilinear reciprocating motion by means of a ball screw mechanism, said rectilinear reciprocating motion being transmitted to the brake pieces as a braking force;

an operating unit controlling the electric drive motor according to manipulation of an operating member;

a rotation detector including a magnetic encoder and a sensor, the magnetic encoder being mounted on a rotating side member of a wheel support bearing assembly for supporting the vehicle wheel, the sensor being mounted in face-to-face relation with the magnetic encoder;

an anti-skid controller regulating the braking force, exerted by the electric drive motor, in dependence on the number of revolutions of the vehicle wheel detected by the rotation detector during a braking effected by manipulation of the operating member, to thereby prevent rotation of the vehicle wheel from being locked, said wheel support bearing assembly comprising an inner race, an outer race positioned radially outwardly of and around the inner race with an annular bearing space defined between the outer race and the inner race, a series of rolling elements drivingly interposed between the inner and outer races, and the magnetic encoder, said magnetic encoder being mounted on one of the inner and outer races which is rotatable relative to the other, wherein the magnetic encoder comprises a ring-shaped core metal made of a metallic material and forming a part of the sealing unit, and a ring-shaped multi-pole magnet disposed on a surface of the core metal, wherein the multi-pole magnet is a member having a plurality of opposite magnetic poles N and S magnetized to alternate in a direction circumferentially thereof, and wherein the neighboring opposite magnetic poles N and S are spaced at intervals of a pitch p that is chosen to be not greater than 1.5 mm, within a single pitch deviation of ±3%, said single pitch deviation being represented by the difference between maximum pitch and minimum pitch in percentage of a targeted pitch, which maximum pitch and minimum pitch are detected by the sensor mounted at a position spaced a predetermined distance from the multi-pole magnet, to detect passage of the opposite magnetic poles.

2. An electrically powered non-hydraulic brake system, comprising:

a brake wheel mounted on a vehicle wheel for rotation together therewith;

an actuating unit including brake pieces frictionally engageable with the brake wheel;

a drive unit translating a rotary output of an electric drive motor into a rectilinear reciprocating motion by means of a ball screw mechanism, said rectilinear reciprocating motion being transmitted non-hydraulically to the brake pieces as a braking force;

an operating unit controlling the electric drive motor according to manipulation of an operating member;

a rotation detector including a magnetic encoder and a sensor, the magnetic encoder being mounted on a rotating side member of a wheel support bearing assembly for supporting the vehicle wheel, the sensor being mounted in face-to-face relation with the magnetic encoder;

an anti-skid controller regulating the braking force, exerted by the electric drive motor, in dependence on the number of revolutions of the vehicle wheel detected by the rotation detector during a braking effected by manipulation of the operating member, to thereby prevent rotation of the vehicle wheel from being locked, said wheel support bearing assembly comprising an inner race, an outer race positioned radially outwardly of end around the inner race with an annular bearing space defined between the outer race and the inner race, a series of rolling elements drivingly interposed between the inner and outer races, and the magnetic encoder, said magnetic encoder being mounted on one of the inner and outer races which is rotatable relative to the other, wherein the magnetic encoder comprises a ring-shaped core metal made of a metallic material and forming a part of the sealing unit, and a ring-shaped multi-pole magnet disposed on a surface of the core metal, the ring-shaped core metal having a curved lip covering a radially outermost part of the multi-pole magnet, wherein the multi-pole magnet is a member having a plurality of opposite magnetic poles N and S magnetized to alternate in a direction circumferentially thereof, and wherein the neighboring opposite magnetic poles N and S are spaced at intervals of a pitch p that is chosen to be not greater than 1.5 mm, within a single pitch deviation of ±3%, said single pitch deviation being represented by the difference between maximum pitch and minimum pitch in percentage of a targeted pitch, which maximum pitch and minimum pitch are detected by the sensor mounted at a position spaced a predetermined distance from the multi-pole magnet, to detect passage of the opposite magnetic poles.

* * * * *

UNITED STATES PATENT AND TRADEMARK OFFICE
CERTIFICATE OF CORRECTION

PATENT NO. : 7,004,290 B2  Page 1 of 1
APPLICATION NO. : 10/780646
DATED : February 28, 2006
INVENTOR(S) : Hisashi Ohtsuki et al.

It is certified that error appears in the above-identified patent and that said Letters Patent is hereby corrected as shown below:

Column 12, line 14 (claim 2, line 27), delete "end" and insert -- and -- therefor.

Signed and Sealed this

Fifth Day of December, 2006

JON W. DUDAS
*Director of the United States Patent and Trademark Office*